United States Patent Office 2,912,403
Patented Nov. 10, 1959

2,912,403

PROCESS OF PLASTICIZING RUBBER WITH A 2-ALKOXY-1-NAPHTHALENETHIOL AND PRODUCTS THEREOF

Arnold R. Davis, Riverside, Conn., assignor to American Cyanamid Company, New York, N.Y., a corporation of Maine No Drawing. Application April 5, 1957
Serial No. 650,811

6 Claims. (Cl. 260—30.8)

This invention relates to improved plasticization of elastomers using a new class of catalytic plasticizers; to elastomeric compositions containing said plasticizers; and to the plasticized compositions.

Many known plasticizers for natural rubber and synthetic rubber-like materials are not wholly satisfactory for one or more of several reasons. Although exhibiting excellent plasticizing properties, some are toxic and/or are skin irritants or sensitizers. Other plasticizers exhibit disagreeable odors which often are also imparted to the finished rubber article. Some are not effective plasticizers at the relative low temperatures of the open mill. Still other plasticizers are unstable on storage. Some which are effective in the processing of natural rubber are found to be ineffective for softening synthetic rubber-like materials. Commercially available plasticizers free of these disadvantages, accordingly, are few.

It is a primary object of this invention to provide an improved process of plasticizing elastomers employing a new class of plasticizers. It is a further object of this invention to provide an improved plasticizing process which is substantially free of the various disadvantages noted above. In accordance with this invention, this improved process comprising plasticizing an elastomer using as a new catalytic plasticizer a substituted naphthalenethiol of the formula

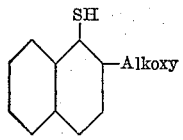

in which the alkoxy radical contains from 1–4 carbon atoms.

The plasticizers of this invention are exceptionally free of the various disadvantages of many known plasticizers. An outstanding feature of these plasticizers is their unusual effectiveness at both high and low milling temperatures. This is particularly unexpected since it has heretofore been believed that a substituted organic mercaptan had to be restricted to carbon and hydrogen substituents on the aromatic nucleus in order to be an effective plasticizer. That the present plasticizers demonstrate any activity at all is, therefore, in itself surprising.

It is a further advantage of this invention that it may be practiced on synthetic rubber-like materials as well as natural rubber. By synthetic rubber-like materials is meant polymers of a butadiene-1,3 such as butadiene-1,3; methyl-2-butadiene-1,3; chloro-2-butadiene-1,3; and the like, as well as copolymers of these with acrylonitrile, styrene, methylmethacrylate, isobutylene, and the like. The amount of plasticizer employed may vary according to the particular elastomer being treated, the particular plasticizer employed as well as the conditions of plasticizing. In general, the amount employed will be from about 0.01–5.0% on the weight of the rubber, the amount usually being somewhat greater for synthetic rubber-like materials than for natural rubber.

Preparation of the plasticizers of this invention is illustrated by the following example. All parts are by weight unless otherwise indicated.

EXAMPLE 1

2-methoxy-1-naphthalenethiol

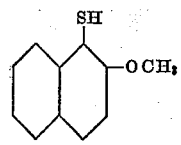

To 50 parts of bis(2-hydroxy-1-naphthyl)disulfide dissolved in 100 parts of water and approximately 80 parts of 20% NaOH is added slowly 70 parts of dimethylsulfate at 25–30° C. A yellow precipitate forms which is isolated by filtration and crystallized without drying from approximately 800 parts of 3A alcohol. A yield of 53% of bis(2-methoxy-1-naphthyl)disulfide having a M.P. of 118–190° C. is obtained.

To 71 parts of the above prepared bis(2-methoxy-1-naphthyl)disulfide dissolved in 945 parts of glacial acetic acid is added with stirring 35 parts of zinc dust at 90° C. and 118 parts of 12 N conc. HCl. After removing excess zinc by filtration, the clear filtrate is poured on ice and the precipitated solid isolated by filtration and dried. 66 parts of 2-methoxy-1-naphthalenethiol, M.P. of 65–68° C., is obtained.

The following examples illustrate the plasticizing effect of the compounds of this invention on natural rubber and synthetic rubber-like materials. Testing was done in a Mooney shearing disc plastometer. The readings in the examples are viscosity readings after 4 minutes in the plastometer at 212° F. The lower the reading the greater the plasticity. All parts are by weight unless otherwise noted.

EXAMPLE 2

Samples of natural rubber are milled for 10 minutes on an open mill at 105° C. One sample is a blank, while the others contain plasticizers as indicated in Table I.

Table I

|  | Sample Number | | | |
|---|---|---|---|---|
|  | 1 | 2 | 3 | 4 |
| Smoked Sheets | 100 | 100 | 100 | 100 |
| 2-Methoxy-1-naphthalenethiol |  | 0.083 | 0.5 |  |
| 2-Ethoxy-1-naphthalenethiol |  |  |  | 0.083 |
| Mooney viscosity at 212° F. (ML–4) | 77 | 46 | 32.5 | 44 |

EXAMPLE 3

A blank sample of natural rubber and one containing 2-methoxy-1-naphthalenethiol are mixed for six minutes in a Banbury with the jacket at 40 lbs. steam. Results are shown in Table II.

Table II

|  | Sample Number | |
|---|---|---|
|  | 1 | 2 |
| Smoked Sheets | 100 | 100 |
| 2-Methoxy-1-naphthalenethiol |  | 0.083 |
| Mooney viscosity at 212° F. (ML–4) | 70 | 36 |

EXAMPLE 4

Samples of GR–S–1502 (75% butadiene and 25% styrene polymerized at 41° F.) and samples of GR–S–1006

(75% butadiene and 25% styrene polymerized at 122° F.) are milled in a Banbury for six minutes with the jacket at 35 lbs. steam. Results appear in Table III.

*Table III*

|  | Sample Number | | | |
|---|---|---|---|---|
|  | 1 | 2 | 3 | 4 |
| GR–S–1006 | 100 | 100 |  |  |
| GR–S–1502 |  |  | 100 | 100 |
| 2-Methoxy-1-naphthalenethiol |  | 0.5 |  | 0.5 |
| Mooney viscosity at 212° F. (ML–4) | 46 | 21.5 | 49.5 | 34.5 |

I claim:

1. In a process of plasticizing an unvulcanized elastomer selected from the group consisting of vulcanizable natural rubber and synthetic rubber-like polymers of butadiene-1,3 by hot mastication, the improvement for increasing the rate of plasticizing which comprises: having present in the elastomer during mastication from about 0.01–5% of a 2-alkoxy-1-naphthalenethiol.

2. A process according to claim 1 in which the plasticizer is 2-methoxy-1-naphthalenethiol.

3. A process according to claim 1 in which the plasticizer is 2-ethoxy-1-naphthalenethiol.

4. A plasticized composition comprising an unvulcanized elastomer selected from the group consisting of vulcanizable natural rubber and synthetic rubber-like butadiene-1,3 polymers and from about 0.01–5% of a 2-alkoxy-1-naphthalenethiol.

5. A composition according to claim 4 in which the compound is 2-methoxy-1-naphthalenethiol.

6. A composition according to claim 4 in which the compound is 2-ethoxy-1-naphthalenethiol.

References Cited in the file of this patent

UNITED STATES PATENTS

| 2,414,145 | Evans | Jan. 14, 1947 |
| 2,463,219 | Trepagnier | Mar. 1, 1949 |

OTHER REFERENCES

Rubber Chemistry and Technology, volume XXVI, No. 1, January–March, 1953, pages 143–151.